US012300146B2

(12) United States Patent
Bae et al.

(10) Patent No.: US 12,300,146 B2
(45) Date of Patent: May 13, 2025

(54) DISPLAY DEVICE

(71) Applicant: Samsung Display Co., Ltd., Yongin-Si (KR)

(72) Inventors: Jongman Bae, Yongin-si (KR); Hyunsu Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 1 day.

(21) Appl. No.: 18/230,158

(22) Filed: Aug. 3, 2023

(65) Prior Publication Data

US 2024/0194117 A1 Jun. 13, 2024

(30) Foreign Application Priority Data

Dec. 13, 2022 (KR) ........................ 10-2022-0174133

(51) Int. Cl.
*G09G 3/20* (2006.01)

(52) U.S. Cl.
CPC ... *G09G 3/2096* (2013.01); *G09G 2320/0626* (2013.01); *G09G 2360/16* (2013.01)

(58) Field of Classification Search
CPC ......... G09G 3/2096; G09G 2320/0626; G09G 2360/16; G09G 3/3233; G09G 3/30; G09G 3/3208; G09G 2310/06; G09G 2310/08; G09G 2340/0435
See application file for complete search history.

(56) References Cited

U.S. PATENT DOCUMENTS 10,638,086 B2 * 4/2020 Ahn ..................... G09G 3/3648
11,205,400 B1 * 12/2021 Jang ..................... G09G 3/2092
11,238,779 B1 * 2/2022 Maruyama ........... G09G 3/3275
11,854,491 B2 * 12/2023 Hatayama ............ G09G 3/3275
11,942,037 B1 * 3/2024 Lian ..................... G09G 3/3266
2006/0092100 A1 * 5/2006 Chou ..................... G09G 5/005 345/55
2012/0154678 A1 * 6/2012 Chang ................... G06F 3/1454 348/E5.009
2013/0187937 A1 * 7/2013 Kerofsky ................. G09G 3/20 345/530
2017/0004766 A1 * 1/2017 Cho ...................... G06F 1/1652
2018/0277034 A1 * 9/2018 Kim ..................... G09G 3/2092
2019/0371250 A1 * 12/2019 Baek .................... G09G 3/3291
2020/0066215 A1 * 2/2020 Koo ..................... G09G 3/3426
2020/0193915 A1 * 6/2020 Noh ..................... G09G 3/3233
2021/0398508 A1 * 12/2021 Lee .......................... G09G 3/20
2023/0066902 A1 * 3/2023 Cheng ................. G06F 3/04184
2024/0304145 A1 * 9/2024 Kang .................. G09G 3/3233

FOREIGN PATENT DOCUMENTS

KR 10-1227284 B1 2/2013
KR 10-2022-0060093 A 5/2022

* cited by examiner

*Primary Examiner* — Temesghen Ghebretinsae
*Assistant Examiner* — Karin Kiyabu
(74) *Attorney, Agent, or Firm* — Innovation Counsel LLP

(57) ABSTRACT

A display device may perform frequency down dimming or frequency up dimming based on a measurement count value generated by counting a number of pulses of an emission signal in frame period. Accordingly, the frequency down dimming or the frequency up dimming may be possible, and the display panel may be driven in a variable refresh rate in which the driving frequency of the display panel changes without a frame memory.

20 Claims, 7 Drawing Sheets

DISPLAY DEVICE

This application claims priority under 35 USC § 119 to Korean Patent Application No. 10-2022-0174133 filed on Dec. 13, 2022, in the Korean Intellectual Property Office (KIPO), the entire disclosure of which is incorporated by reference herein.

BACKGROUND

1. Field

Embodiments of the present inventive concept relate to a display device. More particularly, embodiments of the present inventive concept relate to a display device capable of performing frequency dimming.

2. Description of the Related Art

Generally, a display device may include a display panel and a display panel driver. The display panel may include gate lines, data lines, emission lines and pixels. The display panel driver may include a gate driver for providing gate signals to the gate lines, a data driver for providing data voltages to the data lines, an emission driver for providing emission signals to the emission lines, and a driving controller for controlling the gate driver, the data driver, and the emission driver.

The display device may support a video mode (e.g., a video mode of Mobile Industry Processor Interface (MIPI)) and a still image mode (e.g., a command mode of MIPI). In the video mode, input image data may be transmitted from a host processor to the driving controller in real time.

Meanwhile, in the video mode, the display device without a frame memory may not be driven in a variable refresh rate (VRR) in which a driving frequency of the display panel changes.

SUMMARY

Embodiments of the present inventive concept provide a display device capable of being driven by a variable refresh rate.

Embodiments of the present inventive concept provide a display device capable of being driven by a variable refresh rate.

In an embodiment of a display device according to the present inventive concept, the display device includes a display panel including a pixel, an emission driver configured to provide an emission signal to the pixel, and a driving controller configured to receive input image data and a vertical synchronization signal from a host processor to generate output image data based on the input image data, and to control the emission driver. The driving controller is configured to count a number of pulses of the emission signal in an N-th frame to generate a measurement count value in the N-th frame, where N is a natural number equal to or greater than 2, perform a frequency down dimming and generate a calculation count value in the N-th frame when the measurement count value in the N-th frame is greater than the measurement count value in an N−1-th frame, sequentially increase the number of the pulses of the emission signal in first to M-th dimming frames, where M is a natural number equal to or greater than 2, the first dimming frame being a frame in which the frequency down dimming starts and the M-th dimming frame being a maximum dimming frame in which the frequency down dimming is performed to a maximum limit, and determine M-th dimming frame as a dimming end frame in which the frequency down dimming ends when the M-th dimming frame reaches the maximum dimming frame or when the measurement count value in the N-th frame which follows the M-th dimming frame is less than the calculation count value in the N-th frame.

In an embodiment, when a driving frequency of the display panel in the N-th frame is a maximum driving frequency, input image data in the N-th frame may include a vertical back porch period, a vertical active period, and a vertical front porch period, and when the driving frequency of the display panel in the N-th frame is not the maximum driving frequency, the input image data in the N-th frame may include the vertical back porch period, the vertical active period, and the vertical front porch period, and a variable vertical front porch period.

In an embodiment, when the driving frequency of the display panel in the N-th frame is not the maximum driving frequency, the driving controller may count the number of the pulses of the emission signal during the variable vertical front porch period of the N-th frame.

In an embodiment, the measurement count value in the N-th frame may be the number of the pulses of the emission signal during the variable vertical front porch period of the N-th frame.

In an embodiment, the calculation count value in the N-th frame may be determined by using an [Equation 1] below: $CC1[N]=MC[N-1]+RV$, where $CC1[N]$ denotes the calculation count value in the N-th frame, $MC[N-1]$ denotes the measurement count value in the N−1-th frame, and RV denotes a reference value.

In an embodiment, when the input image data in the N-th frame does not include the variable vertical front porch period, the driving controller may reset the measurement count value in the N-th frame.

In an embodiment, when the measurement count value in the N-th frame is equal to the calculation count value in the N-th frame, the driving controller may transmit a synchronization signal to the host processor.

In an embodiment, when the driving controller transmits the synchronization signal to the host processor, the host processor may transmit the input image data in an N+1-th frame to the driving controller.

In an embodiment, when the N-th frame starts, the vertical synchronization signal may be transmitted to the driving controller.

In an embodiment of a display device according to the present inventive concept, the display device includes a display panel including a pixel, an emission driver configured to provide an emission signal to the pixel, and a driving controller configured to receive input image data and a vertical synchronization signal from a host processor, to generate output image data based on the input image data, and to control the emission drive. The driving controller is configured to count a number of pulses of the emission signal in an N-th frame to generate a measurement count value in the N-th frame, where N is a natural number equal to or greater than 2, perform a frequency up dimming and generate a calculation count value in an M-th dimming frame when the measurement count value in the N-th frame is less than a measurement count value in N−1-th frame, sequentially decrease the number of the pulses of the emission signal in first to the M-th dimming frame, where M is a natural number equal to or greater than 2, the first dimming frame being a frame in which the frequency up dimming starts and the M-th dimming frame being a maximum dimming frame in which the frequency up dimming is performed to a maximum limit, and determine the M-th dimming frame as a dimming end frame in which the frequency up dimming ends when the M-th dimming frame reaches the maximum dimming frame or when the measurement count value in the N-th frame which follows the M-th dimming frame is the same as the measurement count value in the M-th dimming frame.

In an embodiment, when a driving frequency of the display panel in the N-th frame is a maximum driving frequency, input image data in the N-th frame may include a vertical back porch period, a vertical active period, and a vertical front porch period, and when the driving frequency of the display panel in the N-th frame is not the maximum driving frequency, the input image data in the N-th frame may include the vertical back porch period, the vertical active period, and the vertical front porch period, and a variable vertical front porch period.

In an embodiment, when the driving frequency of the display panel in the N-th frame is not the maximum driving frequency, the driving controller may count the number of the pulses of the emission signal during the variable vertical front porch period of the N-th frame.

In an embodiment, the measurement count value in the N-th frame may be the number of the pulses of the emission signal during the variable vertical front porch period of the N-th frame.

In an embodiment, when the driving controller performs the frequency up dimming in the M-th dimming frame, the driving controller may self-skip remaining input image data except for first input image data in the M-th dimming frame to generate output image data in the M-th dimming frame.

In an embodiment, the driving controller may set a threshold frequency, and when a current frequency of the display panel before start of the frequency up dimming may be greater than the threshold frequency, the calculation count value in the first dimming frame which is the N-th frame is determined by using an [Equation 2] below: $CC2=MC[N-1]-(\text{residual}(MC[N-1]/TP))\times TP$, where CC2 denotes the calculation count value in the first dimming frame, MC[N-1] denotes the measurement count value in the N-1-th frame, TP denotes the number of the pulses of the emission signal during a frame period of a target frequency of the host processor, and residual denotes a function for obtaining a fractional part among an integer part and the fractional part.

In an embodiment, the driving controller may set the threshold frequency, and when the current frequency of the display panel before the start of the frequency up dimming is greater than the threshold frequency, the calculation count value in the M-th dimming frame except for the first dimming frame may be determined by using an [Equation 3] below: $CC3[M]=CC2-(TP\times(M-1))$, where CC3[M] denotes the calculation count value in the M-th dimming frame except for the first dimming frame, CC2 denotes the calculation count value in the first dimming frame, TP denotes the number of the pulses of the emission signal during the frame period of the target frequency of the host processor, and M denotes a number of dimming frames from the first dimming frame to the M-th dimming frame.

In an embodiment, the driving controller may set a threshold frequency, and when a current frequency of the display panel before start of the frequency up dimming is less than the threshold frequency, the calculation count value in the first dimming frame may be determined by using an [Equation 4] below: $CC4=TP\times MF$, where CC4 denotes the calculation count value in the first dimming frame, TP denotes the number of the pulses of the emission signal during a frame period of a target frequency of the host processor, and MF denotes a number of dimming frames from the first dimming frame to the maximum dimming frame.

In an embodiment, the calculation count value in the M-th dimming frame except for the first dimming frame may be determined by using an [Equation 5] below: $CC5[M]=CC4-(TP\times(M-1))$, where CC5[M] denotes the calculation count value in the M-th dimming frame except for the first dimming frame, CC4 denotes the calculation count value in the first dimming frame, TP denotes the number of the pulses of the emission signal during the frame period of the target frequency of the host processor, and M denotes a number of dimming frames from the first dimming frame to the M-th dimming frame.

In an embodiment, in the M-th dimming frame, the driving controller may transmit a synchronization signal to the host processor.

In an embodiment, when the driving controller transmits the synchronization signal to the host processor, the host processor may transmit the input image data in an N+1-th frame to the driving controller.

According to the display device according to the embodiments, the display device may perform frequency down dimming based on a measurement count value generated by counting a number of pulses of an emission signal in frame period. Accordingly, the frequency down dimming may be possible, and the display panel may be driven in a variable refresh rate in which the driving frequency of the display panel changes without a frame memory.

According to the display device according to the embodiments, the display device may perform frequency up dimming based on a measurement count value generated by counting a number of pulses of an emission signal in frame period. Accordingly, the frequency up dimming may be possible, and the display panel may be driven in a variable refresh rate in which the driving frequency of the display panel changes without a frame memory.

BRIEF DESCRIPTION OF THE DRAWINGS

The above and other features of embodiments of the present inventive concept will become more apparent by describing in detailed embodiments thereof with reference to the accompanying drawings, in which.

DETAILED DESCRIPTION OF THE EMBODIMENTS

Hereinafter, embodiments of the present inventive concept will be described in detail with reference to the accompanying drawings.

Figure 1:
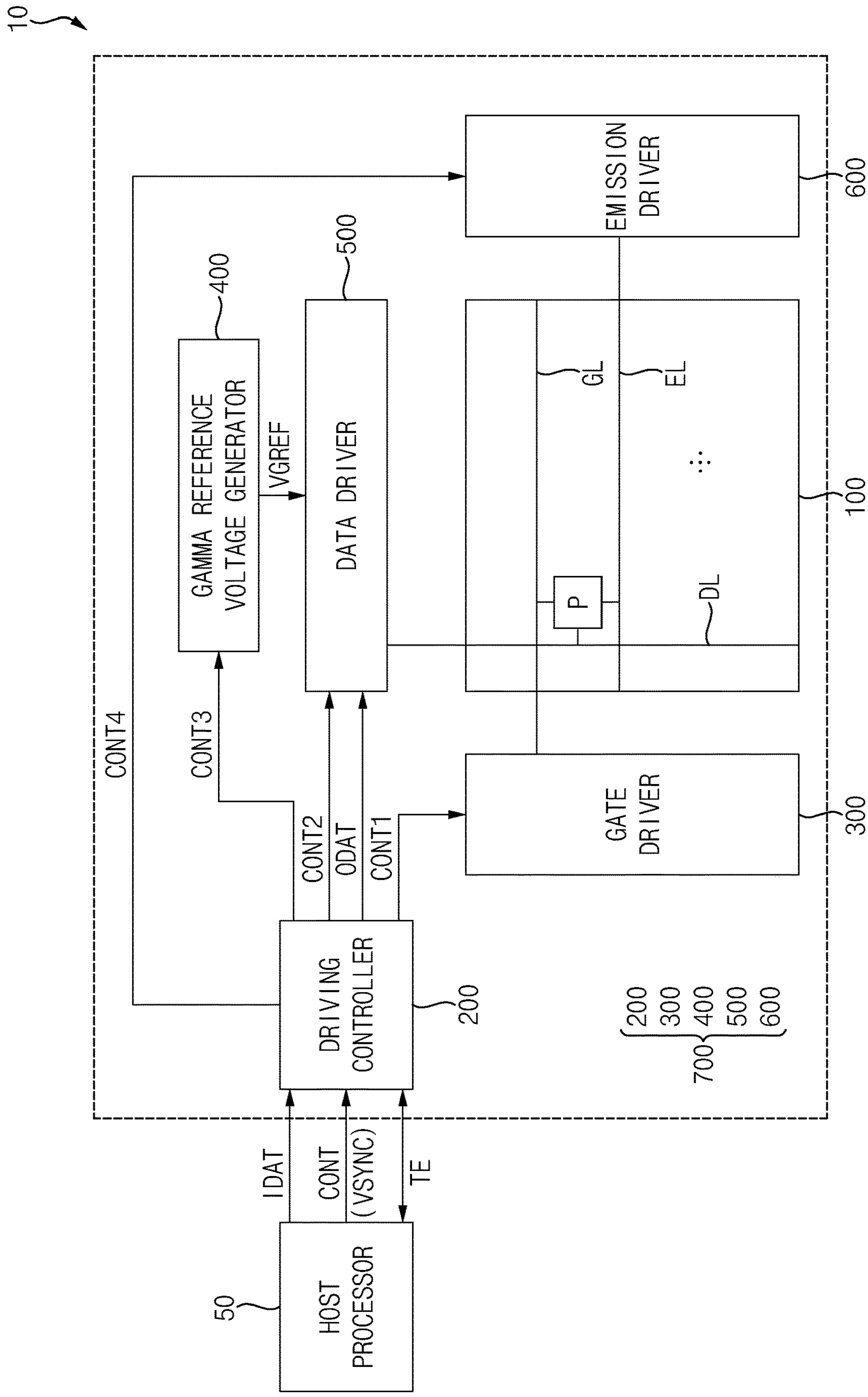
FIG. 1 is a block diagram for illustrating a display device according to embodiments.

FIG. 1 is a block diagram for illustrating a display device 10 according to embodiments.

Referring to FIG. 1, a display device 10 may include a display panel 100 and a display panel driver 700. The display panel driver 700 may include a driving controller 200, a gate driver 300, a gamma reference voltage generator 400, a data driver 500, and an emission driver 600.

The driving controller 200 and the data driver 500 may be embedded in one integrated circuit chip (IC chip). The driving controller 200, the gamma reference voltage generator 400, and the data driver 500 may be embedded in one IC chip. The driving controller 200, the gate driver 300, the gamma reference voltage generator 400, and the data driver 500 may be embedded in one IC chip. The driving controller 200, the grate driver 300, the gamma reference voltage generator 400, the data driver 500, and the emission driver 600 may be embedded in one IC chip. A driving module which includes at least the driving controller 200 and the data driver 500 may be referred to as a timing controller embedded data driver (TED).

The display panel 100 may include a display region displaying an image and a peripheral region disposed adjacent to the display region.

The display panel 100 may be an organic light emitting diode display panel including organic light emitting diodes. The display panel 100 may be a quantum-dot organic light emitting diode display panel including organic light emitting diodes and quantum-dot color filters. The display panel 100 may be a quantum-dot nano light emitting diode display panel including nano light emitting diodes and quantum-dot color filters.

The display panel 100 may include gate lines GL, data lines DL, emission lines EL, and pixels P electrically connected to the gate lines GL, the data lines DL, and the emission lines EL.

The driving controller 200 may receive input image data IDAT and an input control signal CONT from an external device (e.g., a host processor 50). For example, the input image data IDAT may include red image data, green image data, and blue image data. The input image data IDAT may include white image data. The input image data IDAT may include magenta image data, yellow image data, and cyan image data. The input control signal CONT may include a master clock signal and a data enable signal. The input control signal CONT may further include a vertical synchronization signal VSYNC and a horizontal synchronization signal.

The driving controller 200 may generate a first control signal CONT1, a second control signal CONT2, a third control signal CONT3, a fourth control signal CONT4, and an output image data ODAT based on the input image data IDAT and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the output image data ODAT based on the input image data IDAT. The driving controller 200 may output the output image data ODAT to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the emission driver 600 based on the input control signal CONT, and output the fourth control signal CONT4 to the emission driver 600.

The gate driver 300 may generate gate signals for driving the gate lines GL in response to the first control signal CONT1 received from the driving controller 200. The gate driver 300 may output the gate signals to the gate lines GL.

In an embodiment, the gate driver 300 may be integrated on the peripheral region of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each output image data ODAT.

In an embodiment, the gamma reference voltage generator 400 may be disposed in the driving controller 200 or in the data driver 500.

The data driver 500 may receive the second control signal CONT2 and the output image data ODAT from the driving controller 200, and receive the gamma reference voltage VGREF from the gamma reference voltage generator 400. The data driver 500 may convert the output image data ODAT into data voltages in analog form using the gamma reference voltage VGREF. The data driver 500 may output the data voltages to the data lines DL.

The emission driver 600 may generate emission signals for driving the emission lines EL in response to the fourth control signal CONT4 received from the driving controller 200. The emission driver 600 may output the emission signals to the emission lines EL.

Figure 2:
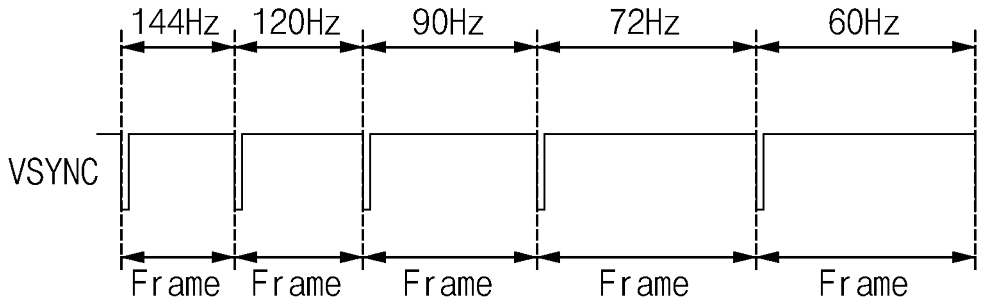
FIG. 2 is a diagram for illustrating a frequency dimming.

FIG. 2 is a diagram for illustrating a frequency dimming.

Referring to FIGS. 1 and 2, a display device 10 may be driven in a variable refresh rate (VRR) in which a driving frequency of a display panel 100 changes. For example, a current frequency CF of the display panel 100 before start of a frequency down dimming may be 144 Hz, and a target frequency TF of a host processor 50 may be 60 Hz. That is, the driving frequency of the display panel 100 may be changed from 144 Hz to 60 Hz. The driving frequency of the display panel 100 may be instantly changed from 144 Hz to 60 Hz without dimming frames. In this case, display quality of the display device 10 may deteriorate. Therefore, a frequency dimming, which gradually changes the driving frequency of the display panel 100 to the target frequency TF, may be performed on the display panel 100. For example, the current frequency CF of the display panel 100 may be 144 Hz. For example, the driving frequency of the display panel 100 may be sequentially changed to 120 Hz, 90 Hz, 72 Hz, and 60 Hz which is the target frequency TF of the host processor 50 during the dimming frames.

The display device 10 may support a video mode (e.g., a video mode of Mobile Industry Processor Interface (MIPI)) and a still image mode (e.g., a command mode of MIPI). In the video mode, input image data IDAT may be transmitted from the host processor 50 to a driving controller 200 in real time.

Figure 3:
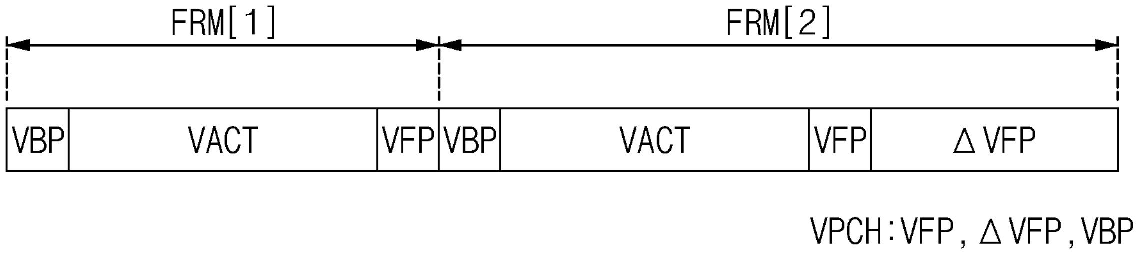
FIG. 3 is a diagram for illustrating frame periods.

FIG. 3 is a diagram for illustrating frame periods.

Referring to FIGS. 1 to 3, a frame period may include a vertical active period VACT and a vertical porch period VPCH. A display device 10 may display an image during the vertical active period VACT. The display device 10 may not display the image during the vertical porch period VPCH.

The vertical porch period VPCH may include a vertical front porch period VFP and a vertical back porch period VBP. The vertical front porch period VFP may follow the vertical active period VACT, and the vertical back porch period VBP may precede the vertical active period VACT.

When a driving frequency of a display panel 100 decreases, a length of the frame period may increase. When the driving frequency of the display panel 100 increases, the length of the frame period may decrease. For example, a driving frequency of a display panel 100 in a first frame FRM[1] of FIG. 3 may be a maximum driving frequency. The driving frequency of the display panel 100 in a second frame FRM[2] of FIG. 3 may be less than the maximum driving frequency.

The frame period may further include a variable vertical front porch period ΔVFP for changing the driving frequency of the display panel 100. The variable vertical front porch period ΔVFP may follow the vertical front porch period VFP. The driving controller 200 may adjust a length of the variable vertical front porch period ΔVFP to change the frequency of the display panel 100. When the driving frequency of the display panel 100 is the maximum driving frequency, the frame period may not include the variable vertical front porch period ΔVFP. When the driving frequency of the display panel 100 is a frequency lower than the maximum driving frequency, the frame period may include the variable vertical front porch period ΔVFP. When the length of the variable vertical front porch period ΔVFP increases, the driving frequency of the display panel 100 may decrease. When the length of the variable vertical front porch period ΔVFP decreases, the driving frequency of the display panel 100 may increase.

That is, when a driving frequency of a display panel 100 in an N-th frame is the maximum driving frequency, input image data IDAT in the N-th frame may include the vertical back porch period VBP, the vertical active period VACT, and the vertical front porch period VFP. When the driving frequency of the display panel 10 in the N-th frame is not the maximum driving frequency, the input image data IDAT in the N-th frame may include the vertical back porch period VBP, the vertical active period VACT, and the vertical front porch period VFP, and the variable vertical front porch period ΔVFP as disclosed in FIG. 3.

Meanwhile, in a video mode, the display device 10 without a frame memory may not be driven in a variable refresh rate. The frame memory is disposed inside the driving controller 200. Specifically, since, in the video mode, the input image data IDAT is transmitted from the host processor 50 to the driving controller 200 in real time, the driving controller 200 may not know an operation of the driving controller 200 itself without the frame memory. The driving controller 200 may not know a target frequency TF1 of the host processor 50 in advance. Therefore, the display device 10 without the frame memory may not be driven in the variable refresh rate.

Figure 4:
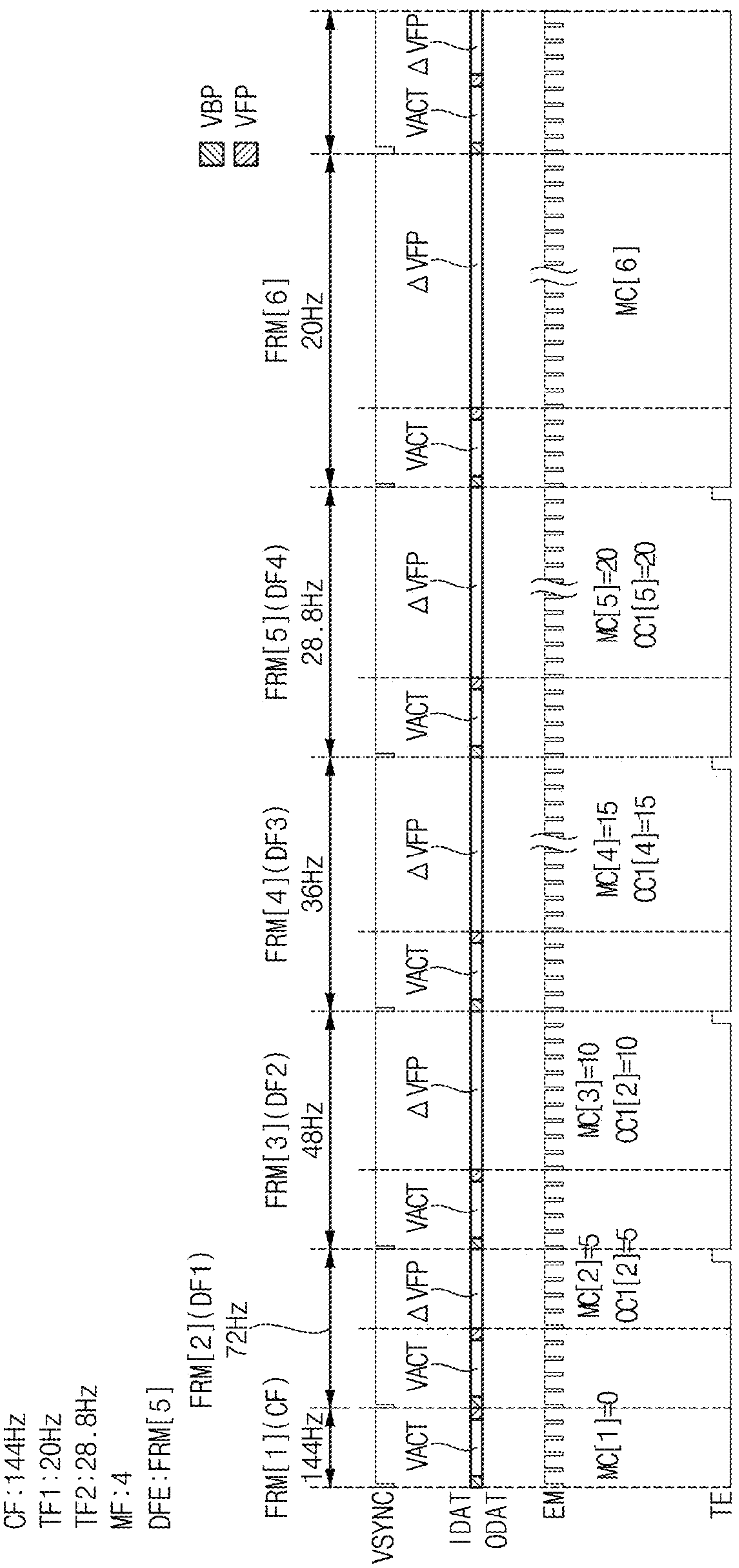
FIG. 4 is a diagram for illustrating an example of a frequency down dimming.

FIG. 4 is a diagram for illustrating an example of a frequency down dimming.

Referring to FIGS. 1 to 4, a driving controller 200 may receive input image data IDAT and a vertical synchronization signal VSYNC from a host processor 50 during a frame period. The driving controller 200 may set a target frequency TF2 of the driving controller 200. For example, the frame period may be defined as a time from a falling edge of the vertical synchronization signal VSYNC to a next falling edge of the vertical synchronization signal VSYNC.

The input image data IDAT may include information about a target frequency TF1 of the host processor 50. An output image data ODAT may include information about the target frequency TF2 of the driving controller 200. The target frequency TF1 of the host processor 50 may be a target driving frequency of a display panel 100 to which the host processor 50 intends to change a current frequency CF of the display panel 100 before start of frequency down dimming. The target frequency TF2 of the driving controller 200 may be a target driving frequency of the display panel 100 to which the driving controller 200 intends to change the current frequency CF of the display panel 100 before the start of the frequency down dimming. The driving frequency of the display panel 100 may be changed from the current frequency CF of the display panel 100 to the target frequency TF1 of the host processor 50 before the start of the frequency down dimming through a variable refresh rate.

In an embodiment, the frequency down dimming may be performed, and the target frequency TF1 of the host processor 50 may be less than the target frequency TF2 of the driving controller 200. For example, a maximum driving frequency of the display panel 100 may be 144 Hz. For example, a number of dimming frames MF from a first dimming frame DF1 to a maximum dimming frame may be 4. For example, the current frequency CF of the display panel 100 before the start of the frequency down dimming may be 144 Hz, the target frequency TF1 of the host processor 50 may be 20 Hz, and the target frequency TF2 of the driving controller may be 28.8 Hz.

As shown in FIG. 4, the driving frequency of the display panel 100 in a first frame FRM[1] may be 144 Hz. Therefore, the first frame FRM[1] may not include a variable vertical front porch period ΔVFP. When an N-th frame FRM[N] includes the variable vertical front porch period ΔVFP (that is, when the driving frequency of the display panel 100 in the N-th frame FRM[N] is not the maximum driving frequency), the driving controller 200 may count a number of pulses of an emission signal EM during the variable vertical front porch period ΔVFP of the N-th frame FRM[N], and generate a measurement count value in the N-th frame. (N is a natural number equal to or greater than 2). The measurement count value in the N-th frame may be the number of the pulses of the emission signal EM during the vertical front porch period ΔVFP of the N-th frame. As shown in FIG. 4, since the first frame FRM[1] may not include the variable vertical front porch period ΔVFP, the driving controller 200 may not count the number of pulses of the emission signal EM. The measurement count value MC[1] in the first frame FRM[1] may be 0. When the input image data IDAT in the N-th frame FRM[N] does not include the variable vertical front porch period ΔVFP, the driving controller 200 may reset the measurement count value in the N-th frame FRM[N].

The driving frequency of the display panel 100 in a second frame FRM[2] may be 72 Hz. That is, the driving frequency of the display panel 100 in the second frame FRM[2] may not the maximum driving frequency, and the driving frequency of the display panel 100 in the second frame FRM[2] may be greater than the target frequency TF1 of the host processor 50. When the measurement count value MC[2] in the second frame FRM[2] is greater than the measurement count value MC[1] in the first frame FRM[1], the frequency down dimming may be performed on the display panel 100. The first dimming frame DF1 may be a frame in which a frequency dimming starts. The maximum dimming frame may be a frame in which the frequency dimming may be performed to a maximum limit. The frequency dimming may be performed from the first dimming frame DF1 to an M-th dimming frame DFM (where M is a natural number equal to or greater than 1). That is, the M-th dimming frame DFM may be a frame in which the frequency dimming ends. The first dimming frame DF1 to the Mth dimming frame DFM may be sequentially disposed between the first dimming frame DF1 and the maximum dimming frame. The number of the pulses of the emission signal EM may sequentially increase in the dimming frames, for example, from the first dimming frame DF1 to the M-th dimming frame DFM. The driving frequency of the display panel 100 in the second frame FRM[2] may not be the maximum driving frequency of the display panel 100. When the measurement count value MC[N] in the N-th frame FRM[N] is greater than the measurement count value MC[N−1] in N−1-th frame FRM[N−1], the driving controller 200 may perform the frequency down dimming and may generate a calculation count value CC1[N] in the N-th frame FRM[N]. The calculation count value CC1[N] in the N-th frame FRM[N] may be illustrated by an [Equation 1] below.

$$CC1[N]=MC[N-1]+RV. \quad \text{[Equation 1]}$$

Here, CC1[N] denotes the calculation count value in the N-th frame FRM[N], MC[N−1] denotes the measurement count value in the N−1-th frame, and RV denotes a reference value.

The reference value RV may be a preset value for calculating the calculation count value CC1[N] in the N-th frame FRM[N]. The reference value RV may be a constant. For example, the reference value RV may be the number of the pulses of the emission signal EM during the variable vertical front porch period ΔVFP of the first dimming frame DF1. As shown in FIG. 4, the number of the pulses of the emission signal EM during the variable vertical front porch period ΔVFP of the first dimming frame DF1 may be 5. However, the number of pulses of the emission signal EM during the variable vertical front porch period ΔVFP of the first dimming frame DF1 may be greater than or less than 5. The calculation count value CC1[2] in the second frame (FRM [2]) may be "CC1[2]=MC[1]+RV=0+5=5" through [Equation 1].

The driving controller 200 may transmit a synchronization signal TE to the host processor 50 in the variable vertical front porch period ΔVFP of the first dimming frame DF1. When the measurement count value MC[N] in the N-th frame FRM[N] is the calculation count value CC1[N] in the N-th frame FRM[N], the driving controller 200 may transmit the synchronization signal TE to the host processor 50. The synchronization signal TE may be transmitted to the host processor 50 immediately before the start of the vertical back porch period VBP in the variable vertical front porch period ΔVFP. The synchronization signal TE may be transmitted from the host processor 50 to the driving controller 200 or from the driving controller 200 to the host processor 50. When the driving controller 200 transmits the synchronization signal TE to the host processor 50 in the N-th frame FRM[N], the host processor 50 may transmit the input image data IDAT[N+1] in N+1-th frame FRM[N+1] to the driving controller 200. The host processor 50 may transmit the input image data IDAT[3] in a third frame FRM[3] to the driving controller 200 in response to the synchronization signal TE. For example, the host processor 50 may start transmitting the input image data IDAT[3] in the third frame FRM[3] when a falling edge of the synchronization signal TE is generated. When the vertical back porch period VBP starts, the vertical synchronization signal VSYNC may be transmitted to the driving controller 200.

A driving frequency of a display panel 100 in the third frame FRM[3] may be 48 Hz. That is, the driving frequency of the display panel 100 in the third frame FRM[3] may not be the maximum driving frequency of the display panel 100 and may be greater than the target frequency TF1 of the host processor 50. When the measurement count value MC[3] in the third frame FRM[3] is greater than the measurement count value MC[2] in the second frame FRM[2], the frequency down dimming may be performed on the display panel 100. Therefore, the third frame FRM[3] may be a second dimming frame DF2. The calculation count value in the third frame FRM[3] may be "CC1[3]=MC[2]+RV=5+5=10" through [Equation 1]. The driving controller 200 may transmit the synchronization signal TE to the host processor 50 in the variable vertical front porch period ΔVFP of the second dimming frame DF2. The host processor 50 may transmit the input image data IDAT[4] in a fourth frame FRM[4] to the driving controller 200 in response to the synchronization signal TE. When the vertical back porch period VBP starts, the vertical synchronization signal VSYNC may be transmitted to the driving controller 200.

The driving frequency of the display panel 100 in the fourth frame FRM[4] may be 36 Hz. That is, the driving frequency of the display panel 100 in the fourth frame FRM[4] may not be the maximum driving frequency of the display panel 100 and may be greater than the target frequency TF1 of the host processor 50. When the measurement count value MC[4] in the fourth frame FRM[4] is greater than the measurement count value MC[3] in the third frame FRM[3], the frequency down dimming may be performed on the display panel 100. Therefore, the fourth frame FRM[4] may be a third dimming frame DF3. The calculation count value in the fourth frame FRM[4] may be "CC1[4]=MC[3]+RV=10+5=15" through [Equation 1]. The driving controller 200 may transmit the synchronization signal TE to the host processor 50 in the variable vertical front porch period ΔVFP of the third dimming frame DF3. The host processor 50 may transmit input image data IDAT[5] in a fifth frame FRM[5] to the driving controller 200 in response to the synchronization signal TE. When the vertical back porch period VBP starts, the vertical synchronization signal VSYNC may be transmitted to the driving controller 200.

The driving frequency of the display panel 100 in the fifth frame FRM[5] may be 28.8 Hz. That is, the driving frequency of the display panel 100 in the fifth frame FRM[5] may not be the maximum driving frequency of the display panel 100 and may be greater than the target frequency TF1 of the host processor 50. When the measurement count value MC[5] in the fifth frame FRM[5] is greater than the measurement count value MC[4] in the fourth frame FRM[4], the frequency down dimming may be performed on the display panel 100. Therefore, the fifth frame FRM[5] may be a fourth dimming frame DF4. The calculation count value in the fifth frame FRM[5] may be "CC1[5]=MC[4]+RV=15+5=20" through [Equation 1]. The driving controller 200 may transmit the synchronization signal TE to the host processor 50 in the variable vertical front porch period ΔVFP of the fourth dimming frame DF4. The host processor 50 may transmit the input image data IDAT[6] in a sixth frame FRM[6] to the driving controller 200 in response to the synchronization signal TE. When the vertical back porch period VBP starts, the vertical synchronization signal VSYNC may be transmitted to the driving controller 200.

The driving frequency of the display panel 100 in the sixth frame FRM[6] may be 20 Hz. That is, the driving frequency of the display panel 100 in the sixth frame FRM[6] may not be the maximum driving frequency of the display panel 100 and may be the target frequency TF1 of the host processor 50. The maximum dimming frame may be the fourth dimming frame DF4 (the fifth frame FRM[5]) because the driving frequency of a frame following the fourth dimming frame(DF4), for example, the sixth frame FRM[6], reaches the target frequency TF1 of the host processor 50. When the M-th dimming frame DFM reaches the maximum dimming frame or when the measurement count value MC[N] in the N-th frame FRM[N] is less than the calculation count value CC1[N] in the N-th frame FRM[N], the driving controller 200 may determine the M-th frame FRM[M] as a dimming end frame DFE in which the frequency down dimming ends. The sixth frame FRM[6] may not be a dimming frame because the measurement count value MC[6] in the sixth frame FRM[6] is less than the calculation count value CC1[6] in the sixth frame FRM[6]. The frequency down dimming may not be performed on the display panel 100 in the sixth frame FRM[6]. Since the sixth frame FRM[6] is not the dimming frame, the driving controller 200 may not transmit the synchronization signal TE to the host processor 50 in the variable vertical front porch period ΔVFP of the sixth frame FRM[6]. When the vertical back porch period VBP starts, the vertical synchronization signal VSYNC may be transmitted to the driving controller 200.

As such, a display device 10 according to the present inventive concept may count the number of the pulses of the emission signal EM in the N-th frame FRM[N] to generate the measurement count value MC[N] in the N-th frame FRM[N], when the current frequency CF is greater than the target frequency TF1 of the host processor 50 and the measurement count value MC[N] in the N-th frame FRM[N] is greater than the measurement count value MC[N−1] in the N−1-th frame FRM[N−1], may perform the frequency down dimming and may generate the calculation count value CC1[N] in the N-th frame FRM[N], may sequentially increase the number of the pulses of the emission signal EM in the dimming frames, for example, between the first dimming frame DF1 in which the frequency down dimming starts and the maximum dimming frame (M-th dimming frame DFM) in which the frequency down dimming is performed to the maximum limit when the M-th dimming frame DFM reaches the maximum dimming frame or when the measurement count value MC[N] in the N-th frame FRM[N] is less than the calculation count value CC1 [N] in the N-th frame FRM[N], may determine the dimming end frame DFE in which the frequency down dimming ends. Therefore, the display device 10 may be driven in the variable refresh rate without the frame memory.

Figure 5:
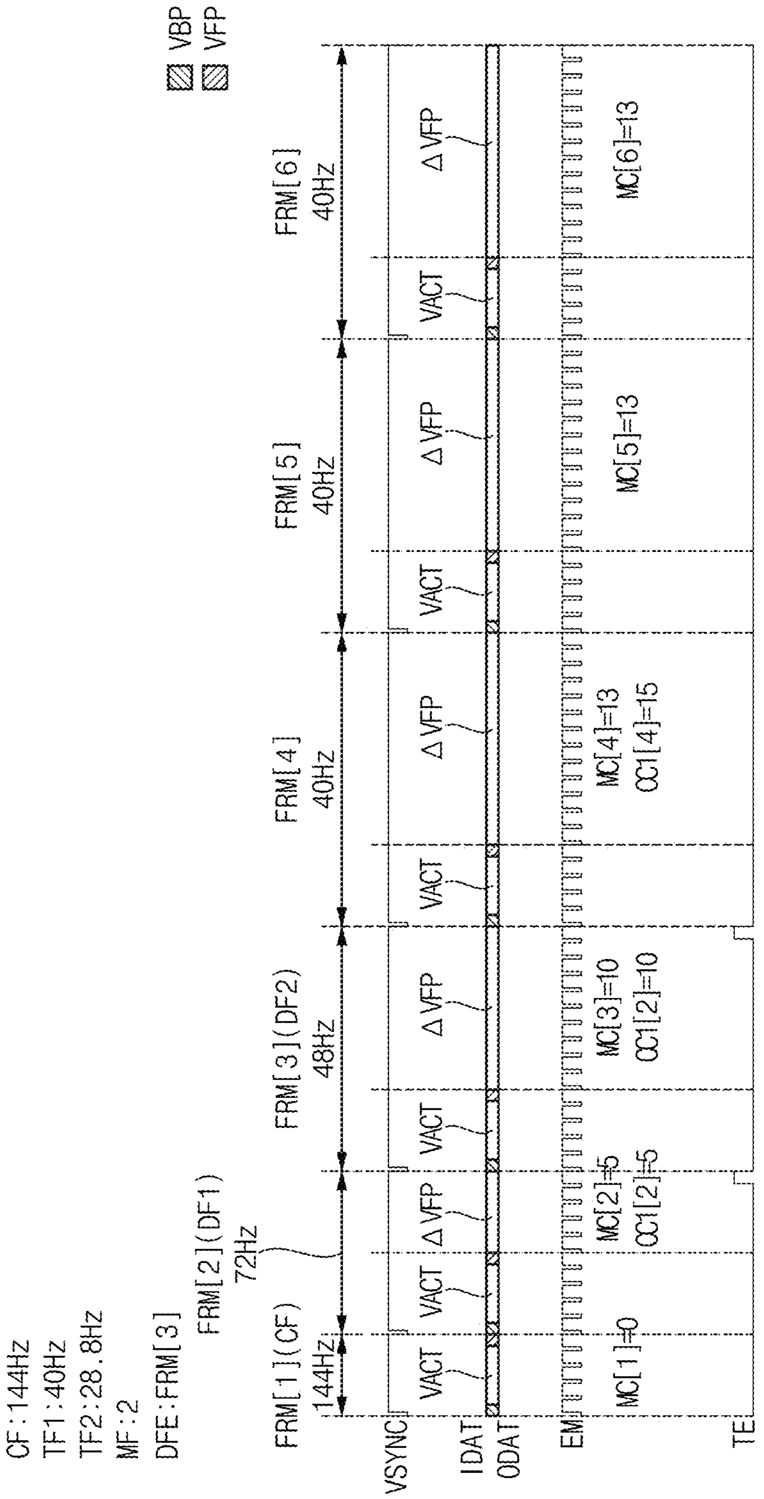
FIG. 5 is a diagram for illustrating an example of a frequency down dimming.

FIG. 5 is a diagram for illustrating an example of a frequency down dimming.

Referring to FIGS. 1 to 5, in an embodiment, a frequency down dimming may be performed and a target frequency TF1 of a host processor 50 may be greater than a target frequency TF2 of a drive controller 200. For example, a maximum driving frequency of a display panel 100 may be 144 Hz. For example, a number of dimming frames MF from a first dimming frame DF1 to a maximum dimming frame may be 2. For example, a current frequency CF of the display panel 100 before start of the frequency down dimming may be 144 Hz, the target frequency TF1 of the host processor 50 may be 40 Hz, and the target frequency TF2 of the driving controller 200 may be 28.8 Hz.

A driving frequency of a display panel 100 in a first frame FRM[1] may be 144 Hz. Therefore, the first frame FRM[1] may not include the variable vertical front porch period ΔVFP. As shown in FIG. 5, since the first frame FRM[1] does not include the variable vertical front porch period ΔVFP, the driving controller 200 may not count a number of pulses of an emission signal EM. A measurement count value MC[1] in the first frame FRM[1] may be 0. When a frame period does not include the variable vertical front porch period ΔVFP, the driving controller 200 may reset the measurement count value MC[N] in an N-th frame FRM[N].

The driving frequency of the display panel 100 in a second frame FRM[2] may be 72 Hz. That is, the driving frequency of the display panel 100 in the second frame FRM[2] may not be the maximum driving frequency of the display panel 100 and may be greater than the target frequency TF1 of the host processor 50. When the measurement count value MC[2] in the second frame FRM[2] is greater than the measurement count value MC[1] in the first frame FRM[1], the frequency down dimming may be performed on the display panel 100. Therefore, the second frame FRM[2] may be a first dimming frame DF1. The calculation count value CC1[2] in the second frame FRM[2] may be "CC1[2]=MC[1]+RV=0+5=5" through [Equation 1]. The driving controller 200 may transmit a synchronization signal TE to the host processor 50 in the variable vertical front porch period ΔVFP of the first dimming frame DF1. The host processor 50 may transmit input image data IDAT[3] in a third frame FRM[3] to the driving controller 200 in response to the synchronization signal TE. When a vertical back porch period VBP starts, a vertical synchronization signal VSYNC may be transmitted to the driving controller 200.

The driving frequency of the display panel 100 in the third frame FRM[3] may be 48 Hz. That is, the driving frequency of the display panel 100 in the third frame FRM[3] may not be the maximum driving frequency of the display panel 100 and may be greater than the target frequency TF1 of the host processor 50. When the measurement count value MC[3] in the third frame FRM[3] is greater than the measurement count value MC[2] in the second frame FRM[2], the frequency down dimming may be performed on the display panel 100. Therefore, the third frame FRM[3] may be a second dimming frame DF2. The calculation count value in the third frame FRM[3] may be "CC1[3]=MC[2]+RV=5+5=10" through [Equation 1]. The driving controller 200 may transmit the synchronization signal TE to the host processor 50 in the variable vertical front porch period ΔVFP of the second dimming frame DF2. The host processor 50 may transmit the input image data IDAT[4] in a fourth frame FRM[4] to the drive controller 200 in response to the synchronization signal TE. When the vertical back porch period VBP starts, the vertical sync signal VSYNC may be transmitted to the driving controller 200.

The driving frequency of the display panel 100 in the fourth frame FRM[4] may be 40 Hz. That is, the driving frequency of the display panel 100 in the fourth frame FRM[4] may not be the maximum driving frequency of the display panel 100 and may be the target frequency TF1 of the host processor 50. The maximum dimming frame is a second dimming frame DF2, but the measurement count value MC[4] in the fourth frame FRM[4] may be less than the calculation count value CC1[4] in the fourth frame FRM[4], so that the fourth frame FRM[4] may not be a dimming frame. The frequency down dimming may not be performed on the display panel 100 in the fourth frame FRM[4]. Since the fourth frame FRM[4] is not the dimming frame, the driving controller 200 may not transmit the synchronization signal TE to the host processor 50 in the variable vertical front porch period ΔVFP of the fourth frame FRM[4]. When the vertical back porch period VBP starts, the vertical synchronization signal VSYNC may be transmitted to the driving controller 200.

As such, a display device 10 according to the present inventive concept may count the number of the pulses of the emission signal EM in the N-th frame FRM[N] to generate the measurement count value MC[N] in the N-th frame FRM[N], when the current frequency CF is greater than the target frequency TF1 of the host processor 50 and the measurement count value MC[N] in the N-th frame FRM[N] is greater than the measurement count value MC[N−1] in the N−1-th frame FRM[N−1], may perform the frequency down dimming and may generate the calculation count value CC1 [N] in the N-th frame FRM[N], may sequentially increase the number of the pulses of the emission signal EM in the dimming frames, for example, from the first dimming frame DF1 in which the frequency down dimming starts to the maximum dimming frame (M-th dimming frame DFM) in which the frequency down dimming is performed to the maximum limit, when the M-th dimming frame DFM reaches the maximum dimming frame or when the measurement count value MC[N] in the N-th frame FRM[N] is less than the calculation count value CC1[N] in the N-th frame FRM[N], may determine the dimming end frame DFE in which the frequency down dimming ends. Therefore, the display device 10 may be driven in the variable refresh rate without the frame memory.

Figure 6:
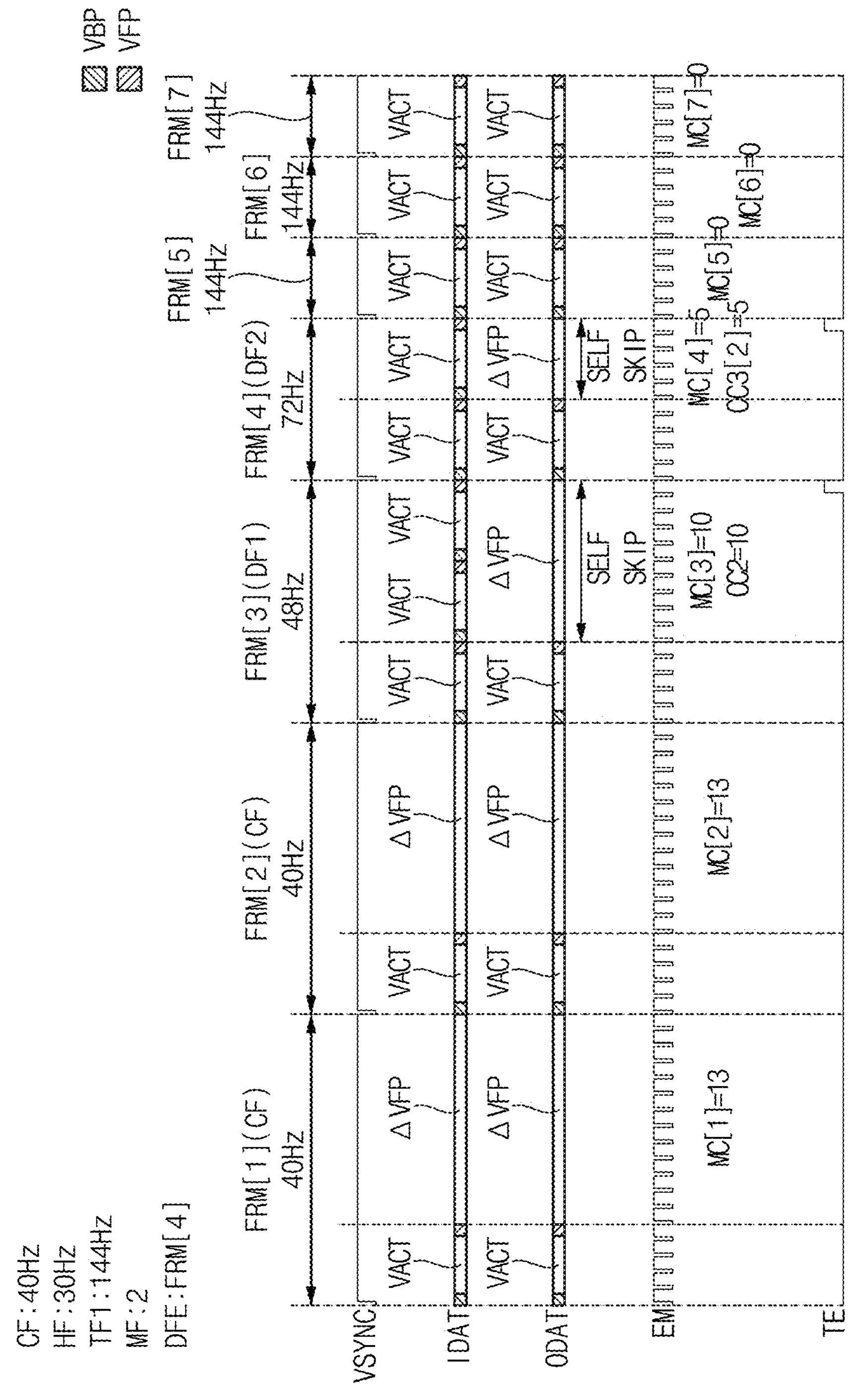
FIG. 6 is a diagram for illustrating an example of a frequency up dimming.

FIG. 6 is a diagram for illustrating an example of a frequency up dimming.

Referring to FIGS. 1 to 6, a driving controller 200 may set a threshold frequency HF. In an embodiment, a frequency up dimming may be performed, and a current frequency CF of a display panel 100 before start of the frequency up dimming may be greater than the threshold frequency HF. The threshold frequency HF may be a driving frequency of a display panel 100 which is a criterion for applying [Equation 2], [Equation 3], [Equation 4], and [Equation 5]. For example, a maximum driving frequency of the display panel 100 may be 144 Hz. For example, a number of dimming frames MF from a first dimming frame DF1 to a maximum dimming frame may be 2. For example, the current frequency CF of the display panel 100 before the start of the frequency up dimming may be 40 Hz, a target frequency TF1 of a host processor 50 may be 144 Hz, and the threshold frequency HF may be 30 Hz.

Driving frequencies of a display panel 100 in a first frame FRM[1] and a second frame FRM[2] may be 40 Hz. That is, the driving frequencies of the display panel 100 in the first frame FRM[1] and the second frame FRM[2] may not be the maximum driving frequency of the display panel 100. A measurement count value MC[1] in the first frame FRM[1] and the measured count value MC[2] in the second frame FRM[2] may be 13.

The driving frequency of the display panel 100 in a third frame FRM[3] may be 48 Hz. That is, the driving frequency of the display panel 100 in the third frame FRM[3] may not be the maximum driving frequency of the display panel 100 and may be less than the target frequency TF1 of the host processor 50. The frequency up dimming may be performed on the display panel 100 in the third frame FRM[3]. When the driving controller 200 performs the frequency up dimming in M-th dimming frame DFM, the driving controller 200 may self-skip remaining input image data except for first input image data in the M-th dimming frame DFM to generate output image data in the M-th dimming frame DFM. The driving controller 200 may self-skip the remaining input image data except for the first input image data in a third frame FRM[3] to generate the output image data ODAT in the third frame FRM[3]. The measurement count value MC[3] in the third frame FRM[3] may be less than the measurement count value MC[2] in the second frame FRM [2]. When the measurement count value MC[N] in an N-th frame FRM[N] is less than the measurement count value in the previous frame, for example, MC[N−1] in an N−1-th frame FRM[N−1], the driving controller 200 may detect a change in the driving frequency of the display panel 100. Accordingly, the third frame FRM[3] may be the first dimming frame DF1. A number of pulses of an emission signal EM may sequentially decrease in dimming frames, for example, from the first dimming frame DF1 in which the frequency up dimming starts to the maximum dimming frame (M-th dimming frame DFM) in which the frequency up dimming is performed to the maximin limit.

When the measurement count value MC[N] in the N-th frame FRM[N] is less than the measurement count value MC[N−1] in the N−1-th frame FRM[N−1], the driving controller 200 may perform the frequency up dimming and may generate a calculation count value in the M-th dimming frame DFM. When the current frequency CF of the display panel 100 before the start of the frequency up dimming is greater than the threshold frequency HF, the calculation count value CC2 in the first dimming frame DF1 which is the N-th frame FRM[N] be illustrated by [Equation 2] below.

$$CC2 = MC[N-1] - \left(\text{residual}\left(\frac{MC[N-1]}{TP}\right)\right) \times TP \quad \text{[Equation 2]}$$

Here, CC2 denotes the calculation count value in the first dimming frame DF1, MC[N−1] denotes the measurement count value in the N−1-th frame FRM[N−1], TP denotes the number of the pulses of the emission signal EM during a frame period of the target frequency TF1 of the host processor 50, and residual denotes a function for obtaining a fractional part among an integer part and the fractional part.

As shown in FIG. 6, the measurement count value MC[2] of the pulses of the emission signal EM in a variable vertical front porch period ΔVFP of the second frame FRM[2] may be 13. However, the above 13 are an only example, and the measurement count value MC[2] of the pulses of the emission signal EM during the variable vertical front porch period ΔVFP of the second frame DF2 may be greater than or less than 13. The number TP of the pulses of the emission signal EM during the frame period of the target frequency TF1 of the host processor 50 may be 5. The calculation count value CC2 in the first dimming frame DF1 may be "CC2=MC[N−1]−(residual(MC[N−1]/TP))*TP=13−(residual(13/5))*5=13−residual(2.6)*5=13−0.6*5=10" through [Equation 2]. The driving controller 200 may transmit the synchronization signal TE to the host processor 50 in the variable vertical front porch period ΔVFP of the first dimming frame DF1. The host processor 50 may transmit the input image data IDAT[4] in a fourth frame FRM[4] to the driving controller 200 in response to the synchronization signal TE. When a vertical back porch period VBP starts, a vertical synchronization signal VSYNC may be transmitted to the driving controller 200.

The driving frequency of the display panel 100 in the fourth frame FRM[4] may be 72 Hz. That is, the driving frequency of the display panel 100 in the fourth frame FRM[4] may not be the maximum driving frequency of the display panel 100 and may be less than the target frequency TF1 of the host processor 50. The frequency up dimming may be performed on the display panel 100 in the fourth frame FRM[4]. The driving controller 200 may self-skip the remaining input image data except for the first input image data in a fourth frame FRM[4] to generate the output image data ODAT in the fourth frame FRM[4]. The fourth frame FRM[4] may be a second dimming frame DF2.

When the current frequency CF of the display panel 100 before the start of the frequency up dimming is greater than the threshold frequency HF, the calculation count value CC3[M] in the M-th dimming frame DFM except for the first dimming frame DF1 may illustrated by [Equation 3] below.

$$CC3[M]=CC2-(TP\times(M-1)) \qquad \text{[Equation 3]}$$

Here, CC3[M] denotes the calculation count value in the M-th dimming frame DFM except for the first dimming frame DF1, CC2 denotes the calculation count value in the first dimming frame DF1, TP denotes the number of the pulses of the emission signal EM during the frame period of the target frequency TF1 of the host processor 50, and M denotes a number of dimming frames from the first dimming frame DF1 to the M-th dimming frame DFM.

The calculation count value CC2 in the first dimming frame DF1 may be 10. The number TP of the pulses of the emission signal EM during the frame period of the target frequency TF1 of the host processor 50 may be 5. The number M of the dimming frames from the first dimming frame DF1 to the M-th dimming frame DFM may be 2. The calculation count value CC3[2] in the second dimming frame DF2 may be CC3[2]=CC2−(TP*(M−1))=10−(5*(2−1))=5” through [Equation 3].

The driving controller 200 may transmit the synchronization signal TE to the host processor 50 in the variable vertical front porch period ΔVFP of the second dimming frame DF2. The host processor 50 may transmit the input image data IDAT[5] in the fifth frame FRM[5] to the driving controller 200 in response to the synchronization signal TE. When the vertical back porch period VBP starts, the vertical synchronization signal VSYNC may be transmitted to the driving controller 200.

The driving frequency of the display panel 100 in a fifth frame FRM[5] may be 144 Hz. That is, the driving frequency of the display panel 100 in the fifth frame FRM[5] may be the maximum driving frequency of the display panel 100 and may be the target frequency TF1 of the host processor 50. When the M-th dimming frame DFM reaches the maximum dimming frame or when the measurement count value MC[N] in the N-th frame FRM[N] is the measurement count value MC[N−1] in the N−1-th frame FRM[N−1], the driving controller 200 may determine the N−1-th frame FRM[N−1] as a dimming end frame DFE in which the frequency up dimming ends. The fifth frame FRM[5] may not be the dimming frame. Since the fifth frame FRM[5] is not the dimming frame, the driving controller 200 may not transmit the synchronization signal TE to the host processor 50 in the variable vertical front porch period ΔVFP of the fifth frame FRM[5].

As such, a display device 10 according to the present inventive concept may count the number of the pulses of the emission signal EM in the N-th frame FRM[N] to generate the measurement count value MC[N] in the N-th frame FRM[N], when the measurement count value MC[N] in the N-th frame FRM[N] is less than the measurement count value MC[N−1] in the N−1-th frame FRM[N−1], may perform the frequency up dimming, may generate the calculation count value CC2, CC3[M] in M-th dimming frame DFM, may sequentially decrease the number of the pulses of the emission signal EM in the dimming frames, for example, from the first dimming frame DF1 in which the frequency up dimming starts to the maximum dimming frame (M-th dimming frame DFM) in which the frequency up dimming is performed to the maximum limit, when the M-th dimming frame DFM reaches the maximum dimming frame or when the measurement count value MC[N] in the N-th frame FRM[N] is the same as the measurement count value MC[N−1] in the N−1-th frame FRM[N−1], may determine the N−1-th frame FRM[N−1] as the dimming end frame DFE in which the frequency up dimming ends. Therefore, the display device 10 may be driven in the variable refresh rate without the frame memory.

Figure 7:
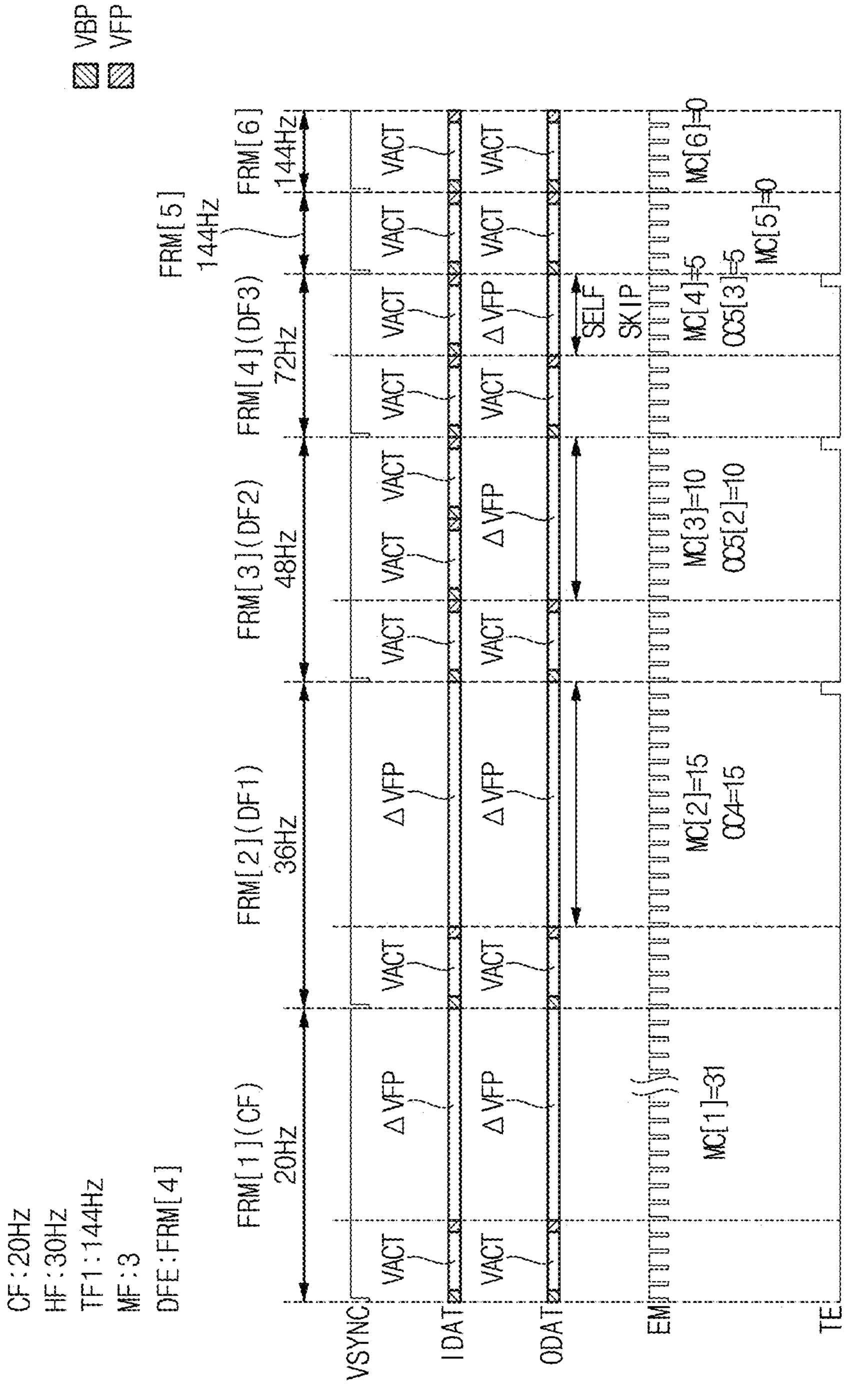
FIG. 7 is a diagram for illustrating an example of a frequency up dimming.

FIG. 7 is a diagram for illustrating an example of a frequency up dimming.

Referring to FIGS. 1 to 7, a driving controller 200 may set a threshold frequency HF. In an embodiment, a frequency up dimming may be performed, and a current frequency CF of a display panel 100 before start of the frequency up dimming may be less than the threshold frequency HF For example, a maximum driving frequency of the display panel 100 may be 144 Hz. For example, a number of dimming frames MF from a first dimming frame DF1 to a maximum dimming frame may be 3. For example, the current frequency CF of the display panel 100 before the start of the frequency up dimming may be 20 Hz, a target frequency TF1 of a host processor 50 may be 144 Hz, and the threshold frequency HF may be 30 Hz.

A driving frequency of a display panel 100 in a first frame FRM[1] may be 20 Hz. That is, the driving frequency of the display panel 100 in the first frame FRM[1] may not be the maximum driving frequency of the display panel 100. A measurement count value MC[1] in the first frame FRM[1] may be 31.

The driving frequency of the display panel 100 in a second frame FRM[2] may be 36 Hz. That is, the driving frequency of the display panel 100 in the second frame FRM[2] may not be the maximum driving frequency of the display panel 100 and may be less than the target frequency TF1 of the host processor 50. The frequency up dimming may be performed on the display panel 100 in the second frame FRM[2]. The driving controller 200 may self-skip remaining input image data except for first input image data in the second frame FRM[2] to generate output image data ODAT in the second frame FRM[2]. A measurement count value MC[2] in the second frame FRM[2] may be less than the measured count value MC[1] in the first frame FRM[1]. When the measurement count value MC[N] in the N-th frame FRM[N] is less than the measurement count value MC[N−1] in the N−1-th frame FRM[N−1], the driving controller 200 may detect a change in the driving frequency of the display panel 100. Therefore, the second frame FRM[2] may be the first dimming frame DF1. A number of pulses of an emission signal EM may sequentially decrease in the dimming frames, for example, from the first dimming frame DF1 in which the frequency up dimming starts to the maximum dimming frame (M-th dimming frame DFM) in which the frequency up dimming is performed to the maximum limit.

When the current frequency CF of the display panel 100 is less than the target frequency TF1 of the host processor 50 and the measurement count value MC[N] in the N-th frame FRM[N] is less than the measurement count value MC[N−1] in the N−1-th frame FRM[N−1], the driving controller 200 may perform the frequency up dimming and may generate a calculation count value CC4. When the current frequency CF of the display panel 100 before the start of the frequency up dimming is less than the threshold frequency HF, the calculation count value CC4 in the first dimming frame DF1 which is the N-th frame FRM[N] may be illustrated by [Equation 4] below.

$$CC4=TP\times MF \quad \text{[Equation 4]}$$

Here, CC4 denotes the calculation count value in the first dimming frame DF1, TP denotes the number of the pulses of the emission signal EM during the frame period of the target frequency TF1 of the host processor 50, and MF denotes the number of the dimming frames from the first dimming frame DF1 to the maximum dimming frame.

The number of the pulses of the emission signal EM during the frame period of the target frequency TF1 of the host processor 50 may be 5. The number MF of the dimming frames from the first dimming frame DF1 to the maximum dimming frame may be 3. The calculation count value CC4 in the first dimming frame DF1 may be "CC4=TP*MF=5*3=15" through [Equation 4]. The driving controller 200 may transmit the synchronization signal TE to the host processor 50 in a variable vertical front porch period ΔVFP of the first dimming frame DF1. The host processor 50 may transmit input image data IDAT[3] in the third frame FRM[3] to the driving controller 200 in response to the synchronization signal TE. When the vertical back porch period VBP starts, the vertical synchronization signal VSYNC may be transmitted to the driving controller 200.

The driving frequency of the display panel 100 in the third frame FRM[3] may be 48 Hz. That is, the driving frequency of the display panel 100 in the third frame FRM[3] may not be the maximum driving frequency of the display panel 100 and may be less than the target frequency TF1 of the host processor 50. The frequency up dimming may be performed on the display panel 100. The driving controller 200 may self-skip the remaining input image data except for the first input image data in the third frame FRM[3] to generate the output image data ODAT in the third frame FRM[3]. The third frame FRM[3] may be the second dimming frame DF2.

When the current frequency CF of the display panel 100 before the start of the frequency up dimming is less than the threshold frequency HF, the calculation count value CC5[M] in the M-th dimming frame DFM except for the first dimming frame DF1 CC5[M] may be illustrated by [Equation 5] below.

$$CC5[M]=CC4-(TP\times(M-1)) \quad \text{[Equation 5]}$$

Here, CC5[M] denotes the calculation count value in the M-th dimming frame DRM except for the first dimming frame DF1, CC4 denotes the calculation count value in the first dimming frame DF1, TP denotes the number of the pulses of the emission signal EM during the frame period of the target frequency TF1 of the host processor 50, and M denotes a number of dimming frames from the first dimming frame DF1 to the M-th dimming frame DFM.

The calculation count value CC4 in the first dimming frame DF1 may be 15. The number TP of the pulses of the emission signal EM during the frame period of the target frequency TF1 of the host processor 50 may be 5. The number M of the dimming frames from the first dimming frame DF1 to the M-th dimming frame DFM may be 2. The calculation count value CC5[2] in the second dimming frame DF2 may be "CC5[2]=CC4−(TP*(M−1))=15−(5*(2−1))=10" through [Equation 5].

The driving controller 200 may transmit the synchronization signal TE to the host processor 50 in the variable vertical front porch period ΔVFP of the second dimming frame DF2. The host processor 50 may transmit the input image data IDAT[4] in the fourth frame FRM[4] to the drive controller 200 in response to the synchronization signal TE. When the vertical back porch period VBP starts, the vertical synchronization signal VSYNC may be transmitted to the driving controller 200.

The driving frequency of the display panel 100 in the fourth frame FRM[4] may be 72 Hz. That is, the driving frequency of the display panel 100 in the fourth frame FRM[4] may not be the maximum driving frequency of the display panel 100 and may be less than the target frequency TF1 of the host processor 50. The frequency up dimming may be performed on the display panel 100. The driving controller 200 may self-skip the remaining input image data except for the first input image data in the fourth frame FRM[4] to generate the output image data ODAT in the fourth frame FRM[4]. The fourth frame FRM[4] may be a third dimming frame DF3. The calculation count value CC5[3] in the third dimming frame DF3 may be "CC5[3]=CC4−(TP*(M−1))=15−(5*(3−1))=5" through [Equation 5].

The driving controller 200 may transmit the synchronization signal TE to the host processor 50 in the variable vertical front porch period ΔVFP of the third dimming frame DF3. The host processor 50 may transmit the input image data IDAT[5] in a fifth frame FRM[5] to the drive controller 200 in response to the synchronization signal TE. When the vertical back porch period VBP starts, the vertical synchronization signal VSYNC may be transmitted to the driving controller 200.

The driving frequency of the display panel 100 in the fifth frame FRM[5] may be 144 Hz. That is, the driving frequency of the display panel 100 in the fifth frame FRM[5] may be the maximum driving frequency of the display panel 100 and may be the target frequency TF1 of the host processor 50. When the M-th dimming frame DFM reaches the maximum dimming frame or when the measurement count value MC[N] in the N-th frame FRM[N] is the same as the measurement count value MC[N−1] in the N−1-th frame FRM[N−1], the driving controller 200 may determine the N−1-th frame FRM[N−1] as a dimming end frame DFE in which the frequency up dimming ends. The fifth frame FRM[5] may not be the dimming frame. Since the fifth frame FRM[5] is not the dimming frame, the driving controller 200 may not transmit the synchronization signal TE to the host processor 50 in the variable vertical front porch period ΔVFP of the fifth frame FRM[5]. When the vertical back porch period VBP starts, the vertical synchronization signal VSYNC may be transmitted to the drive controller 200.

As such, a display device 10 according to the present inventive concept may count the number of the pulses of the emission signal EM in the N-th frame FRM[N] to generate the measurement count value MC[N] in the N-th frame FRM[N], when the measurement count value MC[N] in the N-th frame FRM[N] is less than the measurement count value MC[N−1] in the N−1-th frame FRM[N−1], may perform the frequency up dimming, may generate the calculation count value CC4, CC5[M] in M-th dimming frame DFM, may sequentially decrease the number of the pulses of the emission signal EM in the dimming frames, for example, from the first dimming frame DF1 to the maximum dimming frame (M-th dimming frame DFM) in which the frequency up dimming is performed to the maximum limit, when the M-th dimming frame DFM reaches the maximum dimming frame or when the measurement count value MC[N] in the N-th frame FRM[N] is the same as the measurement count value MC[N−1] in the N−1-th frame FRM[N−1], may determine the N−1-th frame FRM[N−1] as the dimming end frame DFE in which the frequency up dimming ends. Therefore, the display device 10 may be driven in the variable refresh rate without the frame memory.

Figure 8:
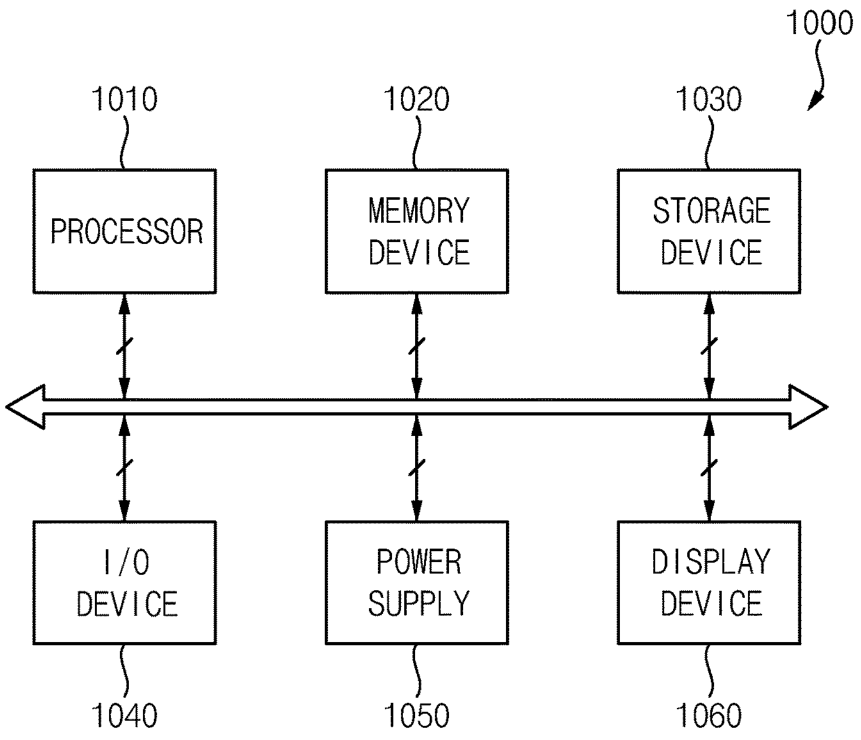
FIG. 8 is a block diagram for illustrating an electronic device.
Figure 9:
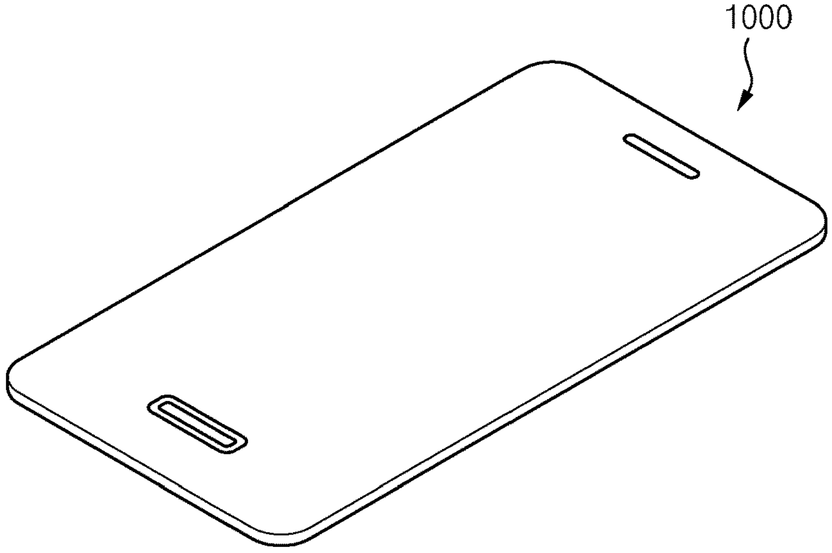
FIG. 9 is a diagram for illustrating an embodiment in which an electronic device in FIG. 8 is implemented as a smart phone.

FIG. 8 is a block diagram for illustrating an electronic device. FIG. 9 is a diagram for illustrating an embodiment in which an electronic device in FIG. 8 is implemented as a smart phone.

Referring to FIGS. 8 and 9, an electronic device 1000 may include a processor 1010, a memory device 1020, a storage device 1030, an input/output (I/O) device 1040, a power supply 1050, and a display device 1060. The display device 1060 may be a display device 10 in FIG. 1. In addition, the electronic device 1000 may further include a plurality of ports for communicating with a video card, a sound card, a memory card, a universal serial bus (USB) device, other electronic device, and the like.

In an embodiment, as illustrated in FIG. 9, the electronic device 1000 may be implemented as a smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions. The processor 1010 may be a micro processor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

The inventive concepts may be applied to any display device and any electronic device including the touch panel. For example, the inventive concepts may be applied to a mobile phone, a smart phone, a tablet computer, a digital television (TV), a 3D TV, a personal computer (PC), a home appliance, a laptop computer, a personal digital assistant (PDA), a portable multimedia player (PMP), a digital camera, a music player, a portable game console, a navigation device, etc.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific embodiments disclosed, and that modifications to the disclosed embodiments, as well as other embodiments, are intended to be included within the scope of the appended claims. The inventive concept is defined by the following claims, with equivalents of the claims to be included therein.

What is claimed is:

1. A display device, comprising:

a display panel including a pixel;

an emission driver configured to provide an emission signal to the pixel; and a driving controller configured to receive input image data and a vertical synchronization signal from a host processor to generate output image data based on the input image data, and to control the emission driver, wherein the driving controller is configured to:

count a number of pulses of the emission signal in an N-th frame to generate a measurement count value in the N-th frame, where N is a natural number equal to or greater than 2, perform a frequency down dimming and generate a calculation count value in the N-th frame when the measurement count value in the N-th frame is greater than a measurement count value in an N−1-th frame, sequentially increase the number of the pulses of the emission signal in first to M-th dimming frames, where M is a natural number equal to or greater than 2, the first dimming frame being a frame in which the frequency down dimming starts and the M-th dimming frame being a maximum dimming frame in which the frequency down dimming is performed to a maximum limit, and determine the M-th dimming frame as a dimming end frame in which the frequency down dimming ends when the M-th dimming frame reaches the maximum dimming frame or when the measurement count value in the N-th frame which follows the M-th dimming frame is less than the calculation count value in the N-th frame.

2. The display device of claim 1, wherein, when a driving frequency of the display panel in the N-th frame is a maximum driving frequency, input image data in the N-th frame includes a vertical back porch period, a vertical active period, and a vertical front porch period, and wherein, when the driving frequency of the display panel in the N-th frame is not the maximum driving frequency, the input image data in the N-th frame includes the vertical back porch period, the vertical active period, and the vertical front porch period, and a variable vertical front porch period.

3. The display device of claim 2, wherein, when the driving frequency of the display panel in the N-th frame is not the maximum driving frequency, the driving controller counts the number of the pulses of the emission signal during the variable vertical front porch period of the N-th frame.

4. The display device of claim 3, wherein the measurement count value in the N-th frame is the number of the pulses of the emission signal during the variable vertical front porch period of the N-th frame.

5. The display device of claim 2, wherein, when the input image data in the N-th frame does not include the variable vertical front porch period, the driving controller resets the measurement count value in the N-th frame.

6. The display device of claim 1, wherein the calculation count value in the N-th frame is determined by using an Equation 1 below:

$$CC1[N]=MC[N-1]+RV,$$

where CC1[N] denotes the calculation count value in the N-th frame, MC[N−1] denotes the measurement count value in the N−1-th frame, and RV denotes a reference value.

7. The display device of claim 1, wherein, when the measurement count value in the N-th frame is equal to the calculation count value in the N-th frame, the driving controller transmits a synchronization signal to the host processor.

8. The display device of claim 7, wherein, when the driving controller transmits the synchronization signal to the host processor, the host processor transmits the input image data in an N+1-th frame to the driving controller.

9. The display device of claim 1, wherein, when the N-th frame starts, the vertical synchronization signal is transmitted to the driving controller.

10. A display device, comprising:

a display panel including a pixel;

an emission driver configured to provide an emission signal to the pixel; and a driving controller configured to receive input image data and a vertical synchronization signal from a host processor, to generate output image data based on the input image data, and to control the emission driver, wherein the driving controller is configured to:

count a number of pulses of the emission signal in an N-th frame to generate a measurement count value in the N-th frame, where N is a natural number equal to or greater than 2, perform a frequency up dimming and generate a calculation count value in an M-th dimming frame when the measurement count value in the N-th frame is less than a measurement count value in an N−1-th frame, sequentially decrease the number of the pulses of the emission signal in first to the M-th dimming frames, where M is a natural number equal to or greater than 2, the first dimming frame being a frame in which the frequency up dimming starts and the M-th dimming frame being a maximum dimming frame in which the frequency up dimming is performed to a maximum limit, and determine the M-th dimming frame as a dimming end frame in which the frequency up dimming ends when the M-th dimming frame reaches the maximum dimming frame or when the measurement count value in the N-th frame which follows the M-th dimming frame is the same as the measurement count value in the M-th dimming frame.

11. The display device of claim 10, wherein, when a driving frequency of the display panel in the N-th frame is a maximum driving frequency, input image data in the N-th frame includes a vertical back porch period, a vertical active period, and a vertical front porch period, and wherein, when the driving frequency of the display panel in the N-th frame is not the maximum driving frequency, the input image data in the N-th frame includes the vertical back porch period, the vertical active period, and the vertical front porch period, and a variable vertical front porch period.

12. The display device of claim 11, wherein, when the driving frequency of the display panel in the N-th frame is not the maximum driving frequency, the driving controller counts the number of the pulses of the emission signal during the variable vertical front porch period of the N-th frame.

13. The display device of claim 12, wherein the measurement count value in the N-th frame is the number of the pulses of the emission signal during the variable vertical front porch period of the N-th frame.

14. The display device of claim 10, wherein, when the driving controller performs the frequency up dimming in the M-th dimming frame, the driving controller self-skips remaining input image data except for first input image data in the M-th dimming frame to generate output image data in the M-th dimming frame.

15. The display device of claim 10, wherein the driving controller sets a threshold frequency, and wherein, when a current frequency of the display panel before start of the frequency up dimming is greater than the threshold frequency, the calculation count value in the first dimming frame which is the N-th frame is determined by using an Equation 2 below:

$$CC2=MC[N-1]-(residual(MC[N-1]/TP))\times TP,$$

where CC2 denotes the calculation count value in the first dimming frame, MC[N−1] denotes the measurement count value in the N−1-th frame, TP denotes the number of the pulses of the emission signal during a frame period of a target frequency of the host processor, and residual denotes a function for obtaining a fractional part among an integer part and the fractional part.

16. The display device of claim 15, wherein the driving controller sets the threshold frequency, and wherein, when the current frequency of the display panel before the start of the frequency up dimming is greater than the threshold frequency, the calculation count value in the M-th dimming frame except for the first dimming frame is determined by using an Equation 3 below:

$$CC3[M]=CC2-(TP\times(M-1)),$$

where CC3[M] denotes the calculation count value in the M-th dimming frame except for the first dimming frame and M denotes a number of dimming frames from the first dimming frame to the M-th dimming frame.

17. The display device of claim 10, wherein the driving controller sets a threshold frequency, and wherein, when a current frequency of the display panel before start of the frequency up dimming is less than the threshold frequency, the calculation count value in the first dimming frame is determined by using an Equation 4 below:

$$CC4=TP\times MF,$$

where CC4 denotes the calculation count value in the first dimming frame, TP denotes the number of the pulses of the emission signal during a frame period of a target frequency of the host processor, and MF denotes a number of dimming frames from the first dimming frame to the maximum dimming frame.

18. The display device of claim 17, wherein the calculation count value in the M-th dimming frame except for the first dimming frame is determined by using an Equation 5 below:

$$CC5[M]=CC4-(TP\times(M-1)),$$

where CC5[M] denotes the calculation count value in the M-th dimming frame except for the first dimming frame and M denotes a number of dimming frames from the first dimming frame to the M-th dimming frame.

19. The display device of claim 10, wherein, in the M-th dimming frame, the driving controller transmits a synchronization signal to the host processor.

20. The display device of claim 19, wherein, when the driving controller transmits the synchronization signal to the host processor, the host processor transmits the input image data in an N+1-th frame to the driving controller.

* * * * *